United States Patent
Oh et al.

(10) Patent No.: US 8,472,565 B2
(45) Date of Patent: Jun. 25, 2013

(54) APPARATUS FOR PROCESSING RECEIVED SIGNAL, METHOD THEREOF, AND METHOD FOR SELECTING MAPPING RULE

(75) Inventors: Min Seok Oh, Anyang-si (KR); Jin Soo Choi, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 600 days.

(21) Appl. No.: 12/301,953

(22) PCT Filed: May 23, 2007

(86) PCT No.: PCT/KR2007/002517
§ 371 (c)(1),
(2), (4) Date: Aug. 20, 2010

(87) PCT Pub. No.: WO2007/136232
PCT Pub. Date: Nov. 29, 2007

(65) Prior Publication Data
US 2010/0303174 A1   Dec. 2, 2010

(30) Foreign Application Priority Data

May 23, 2006 (KR) .......................... 10-2006-0046083

(51) Int. Cl.
*H04L 27/06* (2006.01)
(52) U.S. Cl.
USPC .......................................... 375/340; 375/267
(58) Field of Classification Search
USPC ........................... 375/267, 340, 299, 347, 349
See application file for complete search history.

(56) References Cited

U.S. PATENT DOCUMENTS

| 7,436,895 | B1 * | 10/2008 | Tujkovic | 375/267 |
|---|---|---|---|---|
| 2003/0156659 | A1 * | 8/2003 | Hanaoka et al. | 375/298 |
| 2003/0235149 | A1 * | 12/2003 | Chan et al. | 370/206 |
| 2005/0068918 | A1 * | 3/2005 | Mantravadi et al. | 370/328 |
| 2005/0185575 | A1 | 8/2005 | Hansen et al. | |
| 2006/0036922 | A1 * | 2/2006 | Hong et al. | 714/748 |
| 2006/0056538 | A1 | 3/2006 | Nam et al. | |
| 2006/0250944 | A1 * | 11/2006 | Hong et al. | 370/210 |
| 2006/0253765 | A1 * | 11/2006 | Boer et al. | 714/749 |
| 2007/0041475 | A1 * | 2/2007 | Koshy et al. | 375/340 |
| 2008/0112504 | A1 * | 5/2008 | Jiang et al. | 375/296 |

FOREIGN PATENT DOCUMENTS

| CN | 1568588 | 1/2005 |
|---|---|---|
| CN | 1675853 | 9/2008 |
| EP | 1603252 | 12/2005 |
| WO | 2005029758 | 3/2005 |

\* cited by examiner

*Primary Examiner* — Emmanuel Bayard
(74) *Attorney, Agent, or Firm* — Lee, Hong, Degerman, Kang & Waimey

(57) ABSTRACT

An apparatus for processing a received signal, method thereof, and mapping rule selecting method are disclosed, by which radio communications can be smoothly carried out in a receiving terminal (200) receiving signals via at least two antennas (201a) in a manner of estimating data accurately. The present invention includes performing transmission according to an adaptively decided mapping rule and demapping on a symbol signal received via the plurality of antennas (201a), extracting reliability information for bit signal obtained from the demapping, and re-performing the demapping on the symbol signal received via the plurality of antennas (201 a) using the reliability information.

13 Claims, 16 Drawing Sheets

FIG. 8

(a) Mixed Labeling

| 0000 | 0011 | 0001 | 0010 |
|------|------|------|------|
| 1100 | 1111 | 1101 | 1110 |
| 0100 | 0111 | 0101 | 0110 |
| 1000 | 1011 | 1001 | 1010 |

(b) Random Labeling

| 1010 | 1100 | 0110 | 0101 |
|------|------|------|------|
| 0000 | 1001 | 0011 | 1111 |
| 0111 | 1110 | 0100 | 1000 |
| 1101 | 1011 | 0001 | 0010 |

(c) Gary Labeling

| 0000 | 0001 | 0011 | 0010 |
|------|------|------|------|
| 0100 | 0101 | 0111 | 0110 |
| 1100 | 1101 | 1111 | 1110 |
| 1000 | 1001 | 1011 | 1010 |

(d) Maximum SEW Labeling

| 1111 | 0001 | 0110 | 1000 |
|------|------|------|------|
| 0010 | 1100 | 1011 | 0101 |
| 1001 | 0111 | 0000 | 1110 |
| 0100 | 1010 | 1101 | 0011 |

(e) M16r Labeling

| 0110 | 0011 | 1101 | 1000 |
|------|------|------|------|
| 0000 | 1010 | 0100 | 1110 |
| 1111 | 1001 | 0111 | 0001 |
| 0101 | 1100 | 0010 | 1011 |

(f) Modified SP Labeling

| 1000 | 1011 | 1100 | 1111 |
|------|------|------|------|
| 0001 | 0010 | 0101 | 0110 |
| 0100 | 0111 | 0000 | 0011 |
| 1101 | 1110 | 1001 | 1010 |

APPARATUS FOR PROCESSING RECEIVED SIGNAL, METHOD THEREOF, AND METHOD FOR SELECTING MAPPING RULE

CROSS-REFERENCE TO RELATED APPLICATIONS

This application is the National Stage filing under 35 U.S.C. 371 of International Application No. PCT/KR2007/002517, filed on May 23, 2007, which claims the benefit of earlier filing date and right of priority to Korean Application No. 10-2006-0046083, filed on May 23, 2006.

TECHNICAL FIELD

The present invention relates to a mobile communication system, and more particularly, to an apparatus for processing a received signal, method thereof, and method for selecting-mapping rule.

BACKGROUND ART

Generally, as the demand for high speed multimedia data services rise, many efforts have been made to the technological developments to improve signal quality and spectrum efficiency for the purpose of providing the high speed multimedia data services on mobile radio communication channels.

In a radio communication system, multi-antennas are used to provide transmission diversity. An information capacity in the radio communication system can be considerably increased if the multiple transceiving antennas are used. If the multiple transceiving antennas are used together with a coding scheme, it is able to increase a transceived information capacity more effectively.

In this case, the coding scheme is called a spatiotemporal coding scheme. In the spatiotemporal coding scheme, in order for a receiving terminal to provide a full diversity effect and a coding gain without sacrificing a bandwidth, temporal and spatial correlations with signals transmitted from other antennas are configured with codes. There is STBC (space time block code) scheme as one of the spatiotemporal coding scheme.

FIG. 1A and FIG. 1B are exemplary block diagrams of a transmitting terminal structure and a receiving terminal structure, respectively.

Referring to FIG. 1A and FIG. 1B, a bit interleaved coded orthogonal frequency division multiplexing system using STBC (space time block code) includes a transmitting terminal 10 and a receiving terminal 100.

Referring to FIG. 1A, the transmitting terminal 10 includes a channel encoder 11, a bit interleaver 12, a serial/parallel converter 13, a mapping module 14 having at least two mappers 14a, an STBC encoder 15, and an inverse discrete Fourier transform (IDFT) module 16 having at least two inverse discrete Fourier transformers 16a.

The channel encoder 11 attaches redundant bits to data bits to detect or correct an error that may be generated when transmitting via a channel.

To reduce a burst error and an effect of fading, the bit interleaver 12 mixes and disperses the coded bits by a prescribed bit unit so as to independently arrange the coded bits.

The serial/parallel converter 13 converts a it signal from serial sequence to parallel sequence.

Each of the mappers 14a included in the mapping module 14 transforms a bit signal inputted thereto into a corresponding symbol signal in correspondence to a prescribed mapping rule.

The STBC encoder 15 encodes the symbol signal using a block code for multi-antennas to obtain transmission diversity in time and space.

Each of the IDFTs 16a included in the IDFT module 16 modulates the symbol signal into an OFDM symbol, that is, transforms the symbol signal on a frequency domain into a signal on a time domain, and then transmits the transformed signal. If the IDFT 16a is replaced by an inverse fast Fourier transformer (IFFT), a quantity of calculation is reduced for more efficient implementation.

Referring to FIG. 1B, the receiving terminal 20 includes a discrete Fourier transform (DFT) module 106 having at least two discrete Fourier transformers 106a, an STBC decoder 105, a demapping module 104 having at least two demappers 104a, a parallel/serial converter 103, a bit deinterleaver 102, and a channel decoder 101.

Each of the discrete Fourier transformers 106a included in the discrete Fourier transform module 106 performs Fourier transform on the received OFDM symbol. If the symbol is modulated by the inverse fast Fourier transformer, the discrete Fourier transformer 106a can be replaced by a fast Fourier transformer.

The STBC decoder 105 and the demapper 104a transform the symbol signal transmitted via the multi-antennas into a bit signal.

The parallel/serial converter 103 converts the bit signal from parallel sequence to serial sequence in a manner reverse to that of the serial/parallel converter 13.

The bit deinterleaver 102 changes an order of the bit signal of serial sequence mixed by the interleaver 12 into the original order prior to the mixing.

And, the channel decoder 101 decides estimated data bits.

DISCLOSURE OF THE INVENTION

Technical Problem

However, in case of using the gray mapping rule, although the gray mapping rule shows good performance in execution without iteration, the performance is degraded in the error floor region where iterative decoding is executed.

Moreover, in case of a convolutional code or a block code configured with the convolutional code, decoding execution is associated with a limited code length. Typically, mutual action is not effective between bits distant from each other in a lattice structure. So, in case of using an input data sequence having a considerably long length, effects can be degraded. Even if improvement is obtained by increasing the limited code length, it is disadvantageous that configurational complexity in a decoder may increase exponentially.

Technical Solution

Accordingly, the present invention is directed to an apparatus for processing a received signal, method thereof, and mapping rule selecting method that substantially obviate one or more of the problems due to limitations and disadvantages of the related art.

An object of the present invention is to provide an apparatus for processing a received signal, method thereof, and method for selecting mapping rule, by which radio communications can be smoothly carried out in a receiving terminal receiving signals via at least two antennas in a manner of estimating data accurately.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a received signal in a receiving terminal provided with a plurality of antennas, according to the present invention includes the steps of demapping a symbol signal received via the plurality of antennas to bit signal, according to an mapping rule adaptively decided and used in transmitting terminal, extracting reliability information for the bit signal obtained from the demapping, and re-performing the demapping on the symbol signal using the reliability information.

The symbol signal is transmitted in a manner of being coded by a transmitting terminal using a space-time block code (STBC).

The method further includes the step of decoding the symbol signal received via the plurality of antennas using the space-time block code (STBC).

The steps of extracting reliability information and re-performing demapping are repeated as many as a prescribed count.

The reliability information corresponds to a ratio of a probability that the bit signal becomes 0 to a probability that the bit signal becomes 1.

The mapping rule is decided using a mean bit error value and a harmonic mean of minimum Euclidean distance of the mapping.

The mapping rule is decided in a manner of calculating a mean bit error value for an available mapping rule, a harmonic mean of a minimum Euclidean distance in an error floor, and a non-convergence harmonic mean of a minimum Euclidean distance, discriminating at least one mapping group with reference to the mean bit error value, selecting at least one mapping rule having the biggest harmonic mean of the minimum Euclidean distance in the error floor within the at least one mapping group, and selecting at least one mapping rule having the biggest non-convergence harmonic mean of the minimum Euclidean distance from the selected at least one mapping rule.

If the mapping rule is modulated by 8PSK scheme, binary codes of a prescribed mapping rule are decided in order of 000, 001, 111, 100, 010, 011, 101, and 110 counterclockwise'.

Signaling of information for the mapping is carried out.

The signaling is carried out using either index information for the mapping rule or information indicating whether the mapping rule corresponding different signaling information is used.

A number of the plurality of antennas provided to the receiving terminal is considered in deciding the mapping rule.

To further achieve these and other advantages and in accordance with the purpose of the present invention, a receiving apparatus, which is provided with a plurality of antennas, includes a demapping module obtaining bit signal estimated by performing demapping on a symbol signal received via the plurality of antennas, the demapping module re-performing the demapping on the received symbol signal using reliability information for the bit signal and a reliability information extracting unit extracting the reliability information by receiving the estimated bit signal via the demapping module, the reliability information extracting unit delivering the extracted reliability information to the demapping module.

The symbol signal is coded using space-time block code (STBC) and transmitted.

The receiving apparatus further includes a decoding module receiving the symbol signal coded using the space-time block code (STBC), the decoding module decoding the received symbol signal using the space-time block code (STBC).

The receiving apparatus further includes a soft-in soft-out module outputting the reliability information for the bit signal estimated via the demapping module.

To further achieve these and other advantages and in accordance with the purpose of the present invention, a mapping rule selecting method, which is applied to an iterative decoding scheme for performing decoding using information for reliability of a previously received bit, includes the steps of calculating a mean bit error value, a first metric value, and a second metric value for at least one or more mapping rules corresponding to a specific modulation scheme, grouping the at least one or more mapping rules with reference to the mean bit error value, selecting the mapping rules having a maximum first metric value from the mapping rules belonging to a specific group, and selecting the mapping rules having a maximum second metric value from the selected mapping rules.

The first metric value is a harmonic mean of a minimum squared Euclidean distance in a non-convergence region and the second metric value is a harmonic mean of a minimum squared Euclidean distance in an error floor region.

The mapping rule selecting method further includes the step of selecting one of the selected mapping rules having the maximum second metric value.

Preferably, the mean bit error value is determined by $$N_b = \sum_{i=0}^{M-1} P_x(i) \sum_{j=1}^{N_i} n_b(i, j),$$

where the x(i) is an $i^{th}$ constellation symbol, the $N_b$ is the mean bit error value, the $p_x(i)$ is a probability of x(i), the $N_i$ is a number of constellations neighbor to x(i), the $n_b(i, j)$ is a number of bits errors that the x(i) is incorrectly decided as x(j), and the i and the j are symbol indexes, respectively.

To further achieve these and other advantages and in accordance with the purpose of the present invention, a method of selecting a mapping rule, which is applied to an iterative bit-interleaved coded modulation (BICM) system, includes the steps of grouping an available mapping rule for a specific modulation scheme according to a selection reference, selecting a group according to the selection reference, and selecting a specific mapping rule within the selected group.

The selection reference includes at least one selected from the group consisting of a communication system, a coding scheme, a modulation scheme, a target performance according to traffic, a mean bit error value, and a minimum Euclidean distance harmonic mean.

It is to be understood that both the foregoing general description and the following detailed description are exemplary and explanatory and are intended to provide further explanation of the invention as claimed.

Advantageous Effects

The present invention provides the following effects or advantages.

First of all, the present invention relates to a method and apparatus for reconstructing a received signal more accurately in a manner of optimizing a mapper in a transmitting terminal, extracting prescribed information from signals received via at least two antennas, using the extracted information in performing demapping on each of the signals, and performing decoding by iterating the above procedures.

Secondly, effect on channel can be reduced through transmission diversity using at least two antennas.

Thirdly, a coding gain can be raised through the iterative decoding.

Meanwhile, reliability information for bit signal obtained from demapping can be an example of the prescribed information.

Fourthly, the present invention sets and uses a mapping rule having best performance in demapping, thereby enhancing demapping performance.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is an exemplary diagram of 16QAM constellation mapping rule according to one preferred embodiment of the present invention;

BEST MODE

Mode for Invention

Reference will now be made in detail to the preferred embodiments of the present invention, examples of which are illustrated in the accompanying drawings. One embodiment of the present invention is explained with reference to FIGS. 2A to 2E as follows.

FIGS. 2A to 2E are block diagrams of transmitting terminal structures and receiving terminal structures according to a first embodiment of the present invention.

Figure 1A:
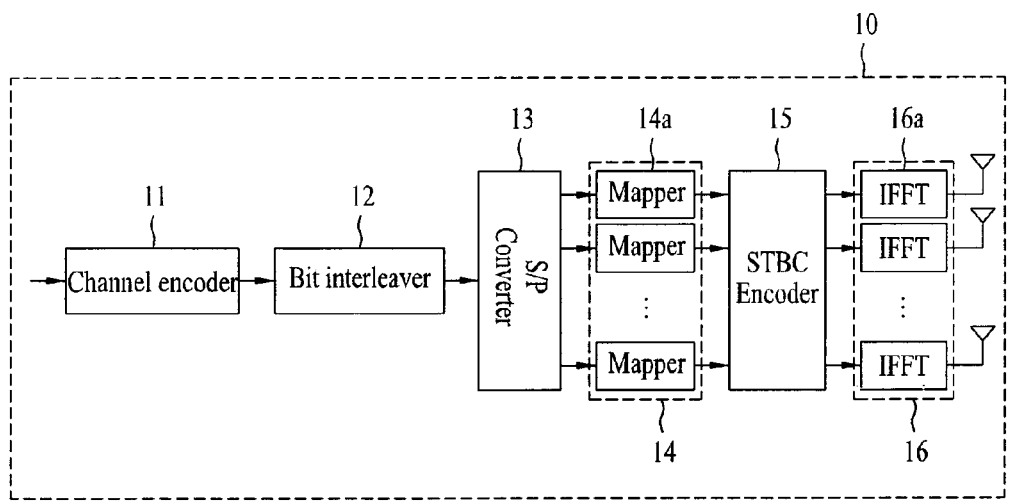
FIG. 1A and FIG. 1B are block diagrams of a transmitting terminal and a receiving terminal according to a related art, respectively.
Figure 1B:
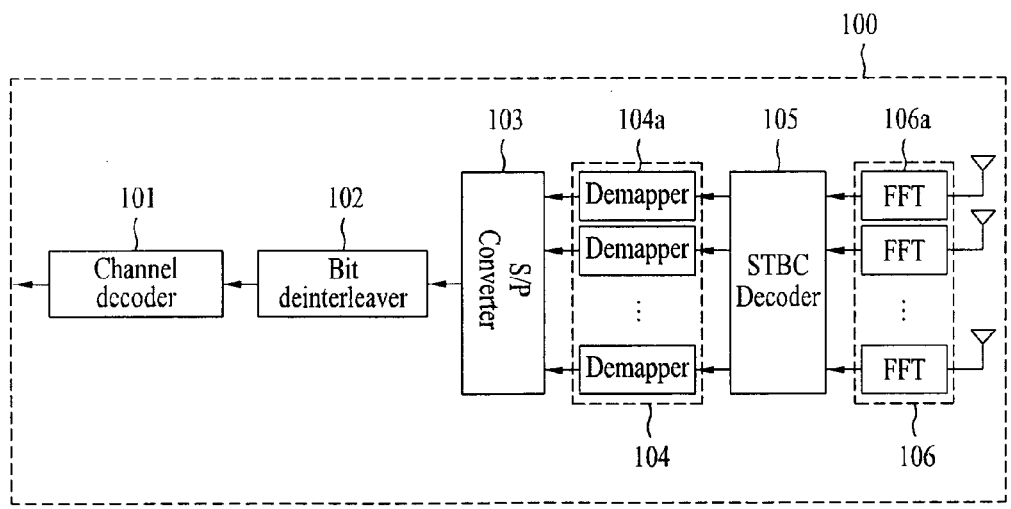
Figure 2A:
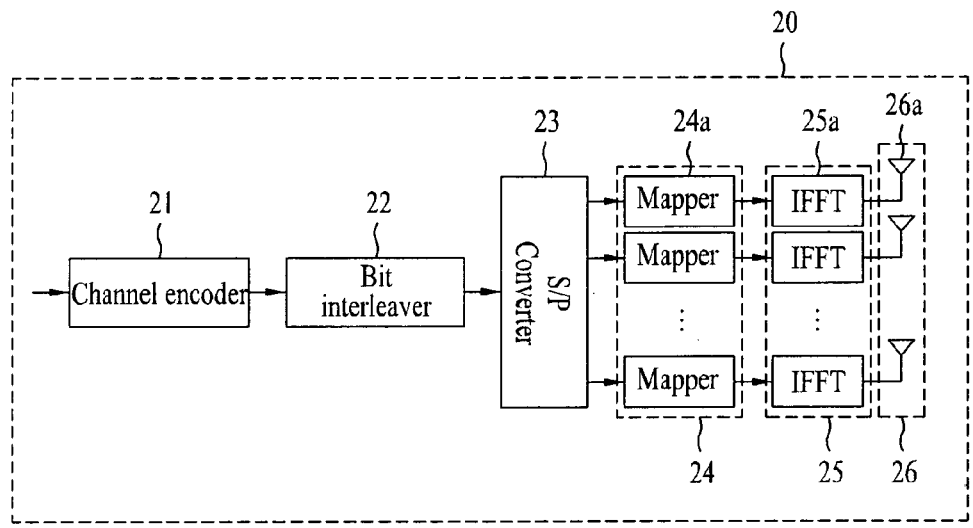
FIGS. 2A to 2E are block diagrams of transmitting terminals and receiving terminals according to a first embodiment of the present invention.

Referring to FIG. 2A showing an example of a transmitting terminal structure, a transmitting terminal 20 includes a channel encoder 21, a bit interleaver 22, a serial/parallel converter 23, a mapping module 24 having at least two mappers 24a, an IFFT (inverse fast Fourier transformer) module 25 having at least two IFFTs (inverse fast Fourier transformers) 25a, and an antenna module 26 having at least two antennas 26a.

The channel encoder 21 outputs coded bits by attaching redundant bits to data bits, as to detect or correct an error that may be generated during transmission through a channel. Herein, convolution code, turbo code, low parity check code (LDPC), Reed-Solomon (RS) code or the like may be used as a channel encoding scheme.

To reduce a burst error and an effect of fading, the bit interleaver 22 mixes and disperses the coded bits by a prescribed bit unit so as to independently arrange the coded bits.

The serial/parallel converter 23 converts the interleaved bits sequence from serial sequence to parallel sequence.

Each of the mappers 24a transforms a bit signal inputted thereto into a corresponding symbol signal according to a prescribed mapping rule.

And, each of the IFFT 25a modulates the symbol signal into an OFDM symbol, transforms the symbol signal on a frequency domain into the symbol signal on a time domain, and then transmits the transformed signal via the antenna module 26 having at least two antennas 26a.

Figure 2B:
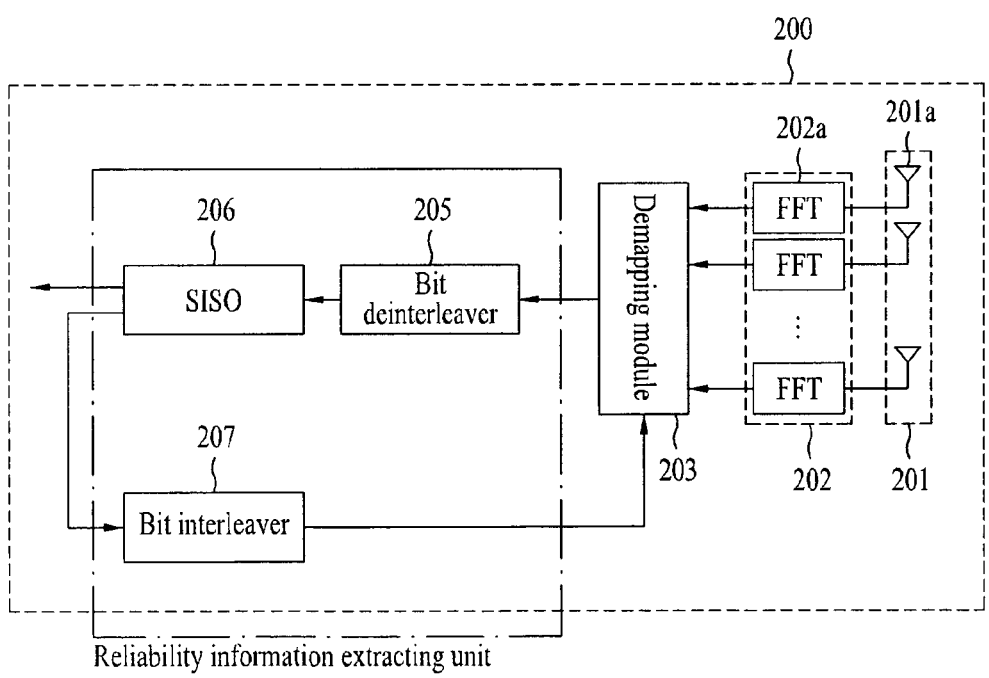

FIG. 2B shows an example of a receiving terminal structure corresponding to the transmitting terminal shown in FIG. 2A.

Referring to FIG. 2B, the receiving terminal 200 includes an antenna module 201 having at least two antennas 201a, a fast Fourier transformer module 202 having at least two FFTs (fast Fourier transformers) 202a, a demapping module 203, and a reliability information extracting unit including a bit deinterleaver 205, a SISO (soft-input soft-output) module 206, and a bit interleaver 207.

Each of the antennas 201a transmits or receives electromagnetic wave energy for signal transceiving via space.

Each of the FFT 202a performs Fourier transform on the signal received via the multi-antenna 201, which was OFDM modulated and transmitted via the multi-antenna 26 in the transmitting terminal. In particular, the FFT 202a transforms the received signal on a time-domain into that on a frequency-domain.

The demapping module 203 coverts the FFT symbol signal into a bit signal.

The bit deinterleaver 205 receives the bit signal from the demapping module 203 and then recovers an original order of the bit signal from the order of the bit signal having been interleaved by the interleaver 22 in the transmitting terminal.

The SISO module 206 outputs reliability information for each of the bit signal inputted thereto.

The bit interleaver 207 changes an order of a bit sequence from the SISO module 206.

And, the reliability information for each signal having the changed order of the bit sequence is delivered to the demapping module 203. And then by the demapping module 203, demapping is performed again using the reliability information.

The transmitting and receiving terminal structures capable of performing the above-explained iterative decoding can be called BICM-ID (bit interleaved coded modulation with iterative decoding).

Figure 2C:
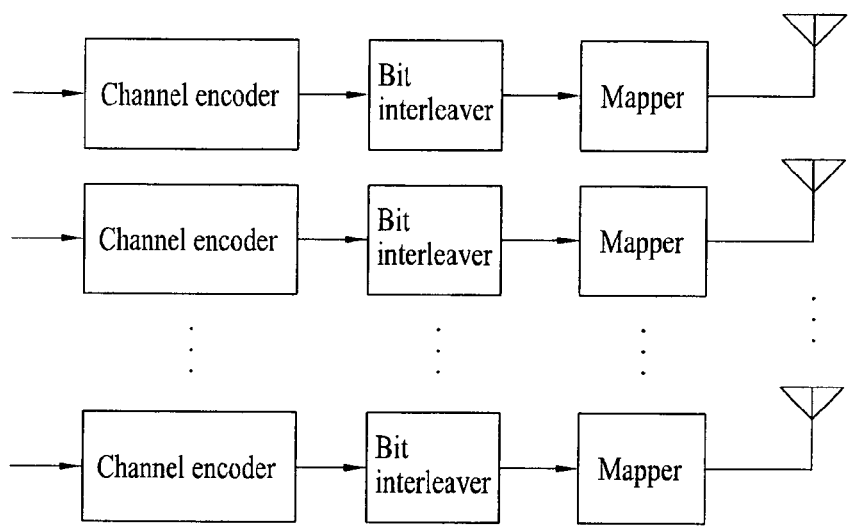
Figure 2D:
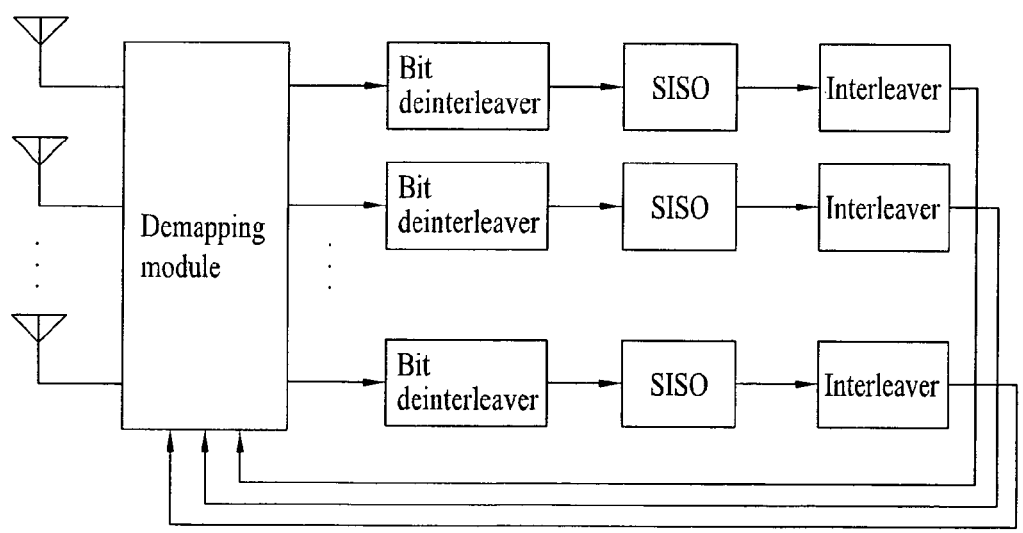
Figure 2E:
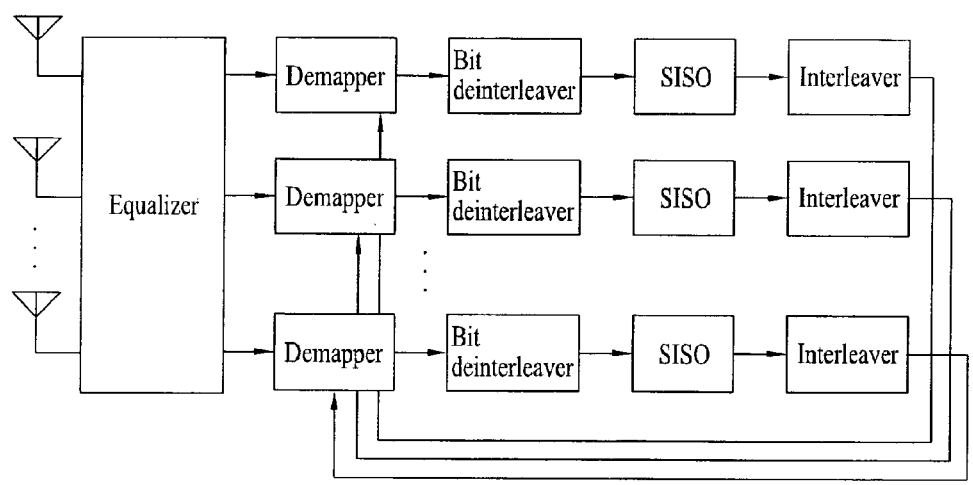

Specifically, FIGS. 2C to 2E exemplarily show the transmitting and receiving terminal structures of BICM-ID MCW (multi-codeword).

FIG. 2C shows an example of a transmitting terminal structure. The transmitting terminal structure shown in FIG. 2C differs from the former structure shown in FIG. 2A in performing independently channel encoding, interleaving and mapping on data packet per each antenna layer.

FIG. 2D shows an example of a receiving terminal structure corresponding to the transmitting terminal structure shown in FIG. 2C. The receiving terminal structure shown in FIG. 2D differs from the former structure shown in FIG. 2B in performing independently deinterleaving and extracting the reliability information per each antenna layer like the transmitting terminal shown in FIG. 2C. Yet, as can be observed from FIG. 2D, the receiving terminal in FIG. 2D is unable to perform demapping for each antenna layer. Instead, joint detection will be executed for all antenna layers at once by ML (maximum likelihood) detection method.

FIG. 2E shows another example of a receiving terminal structure, which differs from FIG. 2D in including an equalizer in addition. In this case, data bits can be extracted by performing demapping for each antenna layer using an equalizer capable of using such a detection method as MMSE (minimum mean-square error), ZF (zero-forcing), and the like.

Operations of one embodiment of the present invention are explained in detail with reference to FIGS. 2A to 3B as follows.

Figure 3A:
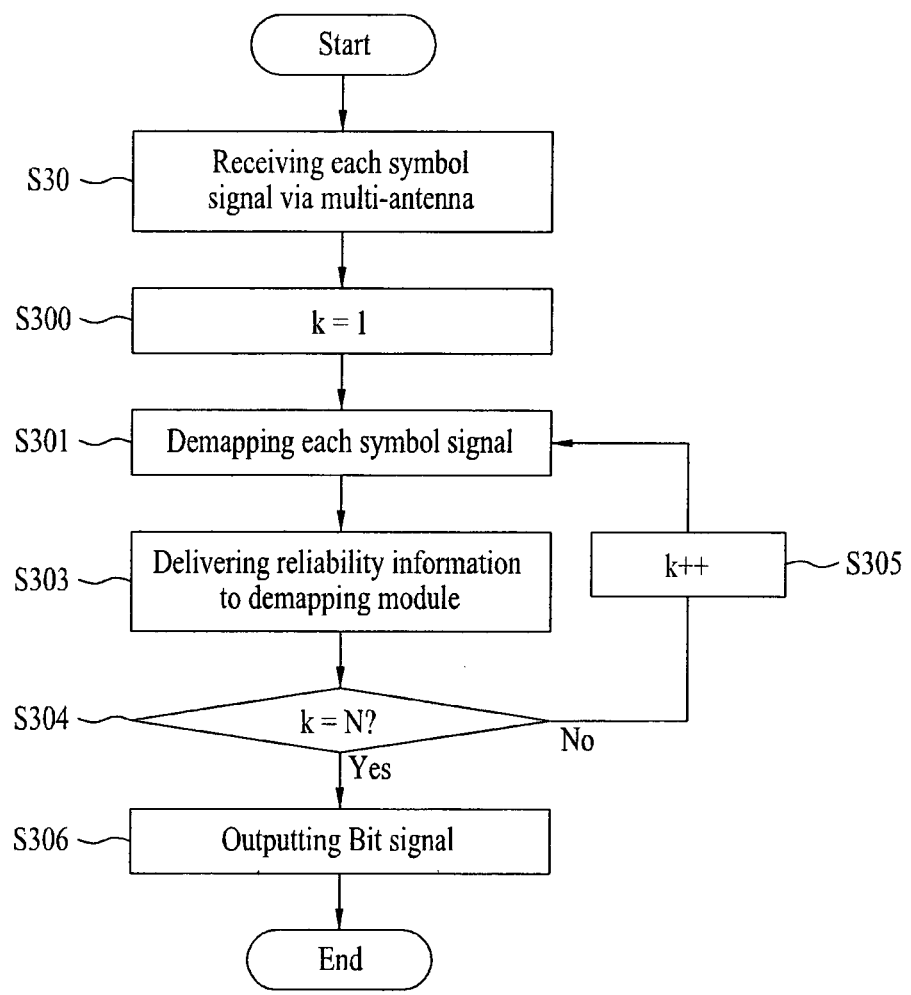
FIG. 3A and FIG. 3B are flowcharts according to a first embodiment of the present invention.
Figure 3B:
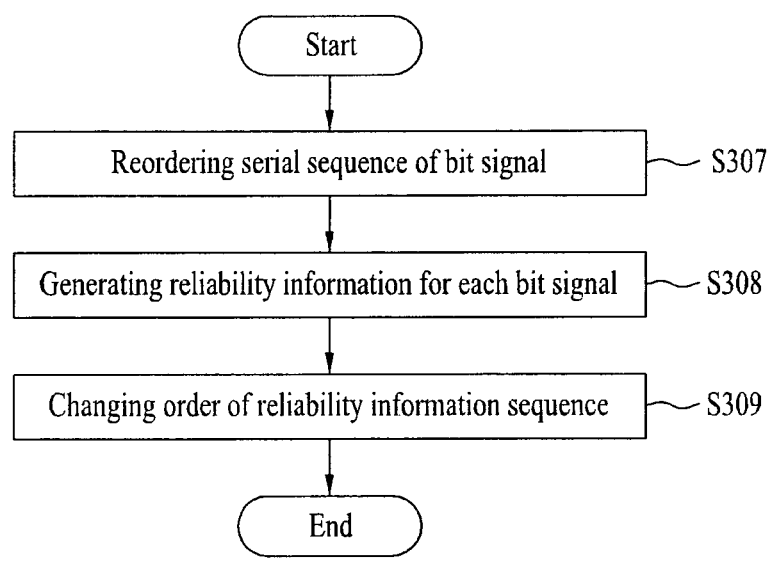

FIGS. 3A and 3B are flowcharts according to a first embodiment of the present invention respectively.

FIG. 3A shows an example of a method of processing a signal in a receiving terminal according to an embodiment of the present invention.

Referring to FIG. 3A, each OFDM symbol signal transmitted by the transmitting terminal 20 is received via the antenna module 201 included in the receiving terminal 200 (S30).

It is able to obtain transmission diversity effect by receiving a signal using a plurality of antennas. In particular, it is able to avoid a considerable effect put on a channel variation attributed to the diversity effect.

The received signal is Fourier-transformed by the FFT 202a. The transformed signal i.e., symbol signal is inputted to the demapping module 203. The symbol signal is then transformed into a bit signal by the demapping module 203 (S301).

The reliability information extracting unit receives the bit signal, generates reliability information for the demapped bit signal generated by the demapping module 203, and then delivers the generated reliability information to the demapping module 203 to demapping again using the generated reliability information (S303).

The demapping module 203 re-executes the demapping by using the received reliability information with an original signal. The process for generating the reliability information for each signal and re-executing the demapping for each signal using the generated reliability information corresponding to the each signal is repeated as many as a prescribed count and demapped bit is then outputted (S305, S306).

FIG. 3B shows a detailed flowchart of the step S303 of generating the reliability information to be delivered to the demapping module 203.

A process for generating reliability information via a reliability information extracting unit is explained with reference to FIG. 3B as follows.

First of all, the bit signal generated from the demapping module 203 is inputted to the bit deinterleaver 205 and the order of the interleaved bit sequence is then rearranged to the original order of the bit sequence by the bit deinterleaver 205 (S307).

The order-rearranged bit sequence is inputted to the SISO (soft-input soft-output) module 206. The SISO module 206 generates reliability information using the inputted signal to be delivered to the demapping module 203 (S309).

For instance, the information can be generated using Formula 1.

$$L(d_j^i) = \log \frac{p(d_j^i = +1)}{p(d_j^i = -1)}. \quad \text{[Formula 1]}$$

The result of Formula 1 indicates an extent of reliability in demapping the inputted symbol signal. For this, the extent of reliability may correspond with a probability value that the inputted symbol signal becomes '+1' or '−1'.

In Formula 1, $d_j^i$ indicates information corresponding to an $i^{th}$ bit of a $j^{th}$ symbol signal. According to Formula 1, the reliability information can be obtained by performing a log operation on a ratio of a probability value that a symbol corresponding to a bit inputted to the SISO module becomes '+1' to a probability value that the symbol corresponding to a bit value inputted to the SISO module becomes '−1'.

The reliability information generated by the SISO module 206 using Formula 1 is inputted to the bit interleaver 207. The bit interleaver 207 then changes an order of the reliability information for the respective inputted bit signals by the method of interleaving the original order of the bit sequence in the interleaver 22 of the transmitting terminal 20 (S309).

The reliability information rearranged to the original order is delivered to the demapping module 203 (S303). The demapping module 203 is able to raise a 'value of the extent of reliability by demapping a symbol signal with having the inputted reliability information included in a previously inputted symbol signal. If the value of the extent of reliability is raised, it is able to reconstruct an original bit signal from transmitting terminal more accurately. So, performance of the demapping module 203 is enhanced. In other words, instead of demapping, decoding and directly outputting the inputted signal in the FFT 202a, after the course of decoding and demapping, the reliability information is generated and the demapping is carried out on the respective inputted signals using the generated reliability information iteratively.

$$\log \frac{p(d_j^i = +1 \mid r_j, H_j)}{p(d_j^i = -1 \mid r_j, H_j)} = \log \frac{\sum_{z_j \in S_{+1}^i} p(z_j, r_j, H_j)}{\sum_{z_j \in S_{-1}^i} p(z_j, r_j, H_j)}. \quad \text{[Formula 2]}$$

For another example of calculating the reliability information value, Formula 2 indicates a method of calculating the reliability information value by having channel status information additionally included in Formula 1.

In Formula 2, $S_d^i$ indicates a set of symbols of which an $i^{th}$ bit of bit sequence is 'd'. A value of the 'd' can become '+1' or '−−1'. The demapping and decoding can be iterated as many as a prescribed count. And, value of the reliability information is updated in a manner that the value calculated in a previous iterative process is included in the reliability information value in each iterative process while the above method is iterated. An exemplary method of generating the reliability information value updated in Formula 2 is explained with reference to Formula 3 as follows.

$$p(z_j, r_j, H_j) \sim \exp\left(-\frac{1}{N_0}|r_j - \alpha z_j|^2 + \frac{1}{2}\sum_{i=1}^{\log_2 M} d_j^i L(d_j^i)\right) \quad \text{[Formula 3]}$$

In Formula 2 and Formula 3, $Z_j$ indicates a $j^{th}$ symbol signal transmitted by the transmitting terminal, indicates a $j^{th}$ symbol signal received by the receiving terminal, and $H_j$ indicates a channel constant in case of a reception via the $j^{th}$ receiving antenna 201. In Formula 3, 'M' indicates a size of constellation mapping, $N_0$ indicates a complex noise power.

In Formula 3, the result value calculated in Formula 1 is included. In particular, the transmitted bit signal can be more accurately estimated in a manner of having the reliability information generated by using Formula 1 or Formula 2 included in the corresponding calculation in Formula 3 which is generating the updated reliability information as above mentioned.

A process for calculating the reliability information again using the demapping result and re-executing demapping using the reliability information is repeated. If this process is repeated, an absolute value of the estimated data bit value is increased. So, it is able to decide data bits more accurately. Thus, a data bit signal, which is estimated after iterating the data bit estimating process as many as a prescribed count, is finally estimated (S306).

A second embodiment of the present invention is explained with reference to FIGS. 4A to 4E as follows.

FIGS. 4A to 4E are block diagrams of transmitting terminals and receiving terminals according to a second embodiment of the present invention. The same configurations as shown in FIG. 2A and FIG. 2B are omitted in the following description. FIGS. 4A to 4E differ from FIG. 2A and FIG. 2B in including an STBC (space time block code) encoder 45 or an STBC decoder 403. The STBC encoder/decoder 45/403 performs coding/decoding of transmitting symbols in time and space to obtain transmission diversity.

In a radio communication system, it is able to considerably increase a transmitting information quantity using a multi-antenna. In order to effectively increase a data transmitting speed, it is able to apply a proper coding scheme to a multiple transmitting antenna. And, this coding scheme is called STC (space time code) scheme. The STC scheme uses spatial and temporal correlations to signals transmitted from different antennas in order for a receiving terminal to provide a perfect diversity effect and a coding gain without sacrificing a bandwidth. An example of the STC scheme is STBC (space time block code). In the space time block code, a receiving terminal uses a very simple decoding algorithm.

Assuming that four antennas are used to reduce complexity and assuming that ¾ STBC structure is selected, an example of the STBC code matrix is proposed by Formula 4.

$$C = \begin{bmatrix} z_1 & z_2 & z_3 & 0 \\ -z_2^* & z_1^* & 0 & -z_3 \\ -z_3^* & 0 & z_1^* & z_2 \\ 0 & z_3^* & -z_2^* & z_1 \end{bmatrix}$$ [Formula 4]

In Formula 4, $Z_3$ indicates a symbol signal transmitted by a $j^{th}$ antenna of a transmitting terminal. If STBC coding is carried out through the code matrix proposed by Formula 4, three symbol signals are transmitted for four time slots. The structure of performing STBC coding additionally on BICM-ID capable of performing the aforementioned iterative decoding can be named STBC-BICM-ID. Of course, STBC coding may be applicable to other STBC structures as well as the above example.

Figure 4A:
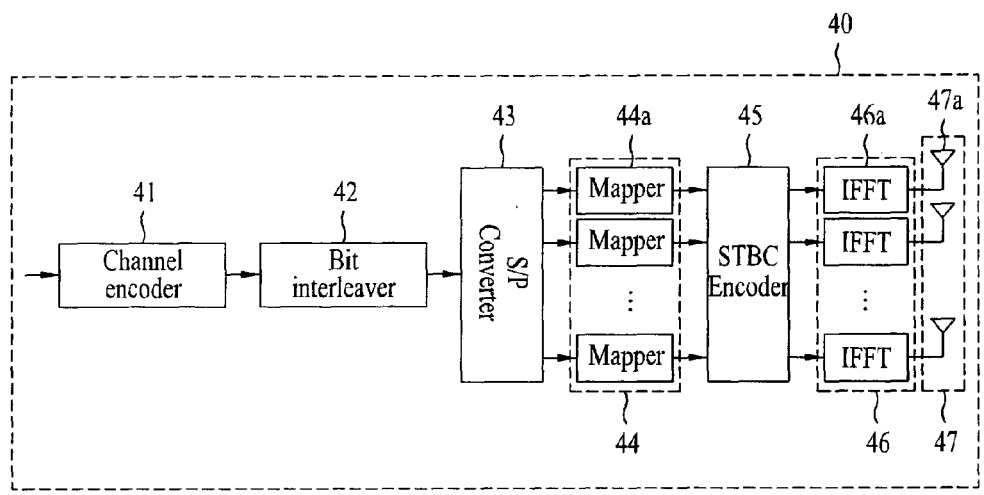
FIGS. 4A to 4E are block diagrams of transmitting terminals and receiving terminals according to a second embodiment of the present invention.
Figure 4B:
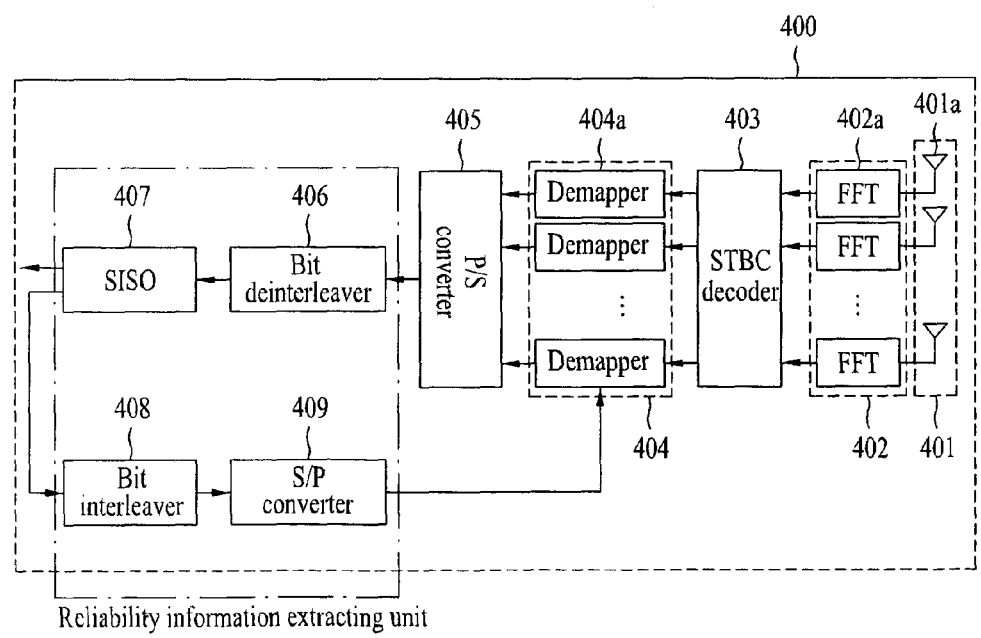
Figure 4C:
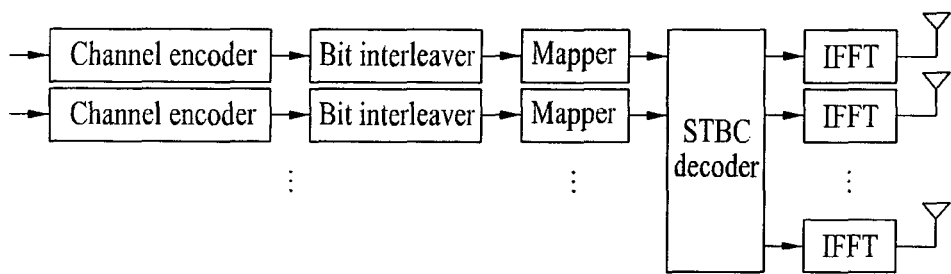
Figure 4D:
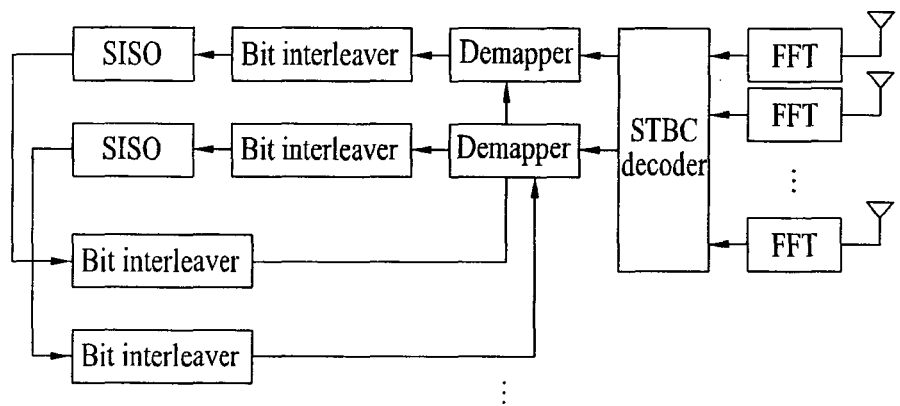
Figure 4E:
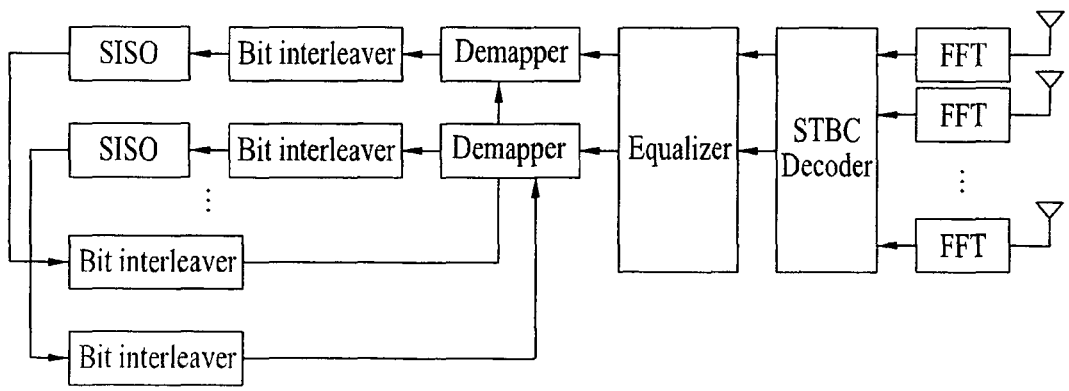

Specifically, FIGS. 4C to 4E show transmitting and receiving terminal structure of STBC-BICM-ID MCW (multi code word).

FIG. 4C shows an example of a structure of transmitting terminal. Like FIG. 2C, FIG. 4C differs from FIG. 4A in that a data packet from the each antenna of a transmitting terminal is independently encoded, interleaved and mapped per the each antenna layer.

FIG. 4D shows an example of a receiving terminal structure corresponding to the transmitting terminal shown in FIG. 4C. Unlike FIG. 2D, the receiving terminal shown in FIG. 4D is capable of performing decoding per each antenna layer as well as demapping and deinterleaving. In this case, the demapping can be performed per each antenna layer. This is because the receiving terminal is capable of discriminating a signal per antenna using STBC having orthogonal characteristic. So, in case that STBC having no orthogonal characteristic is used, it is unable to perform demapping per the each antenna layer. Instead, ML common detection will be performed at once.

FIG. 4E shows another example of a receiving terminal structure. Compared to FIG. 4D, FIG. 4E includes an equalizer in addition. In this case, a data symbol can be extracted per each antenna layer using an equalizer capable of using such a detection method as MMSE, ZF, and the like instead of ML detection like the case shown in FIG. 2E.

Figure 5:
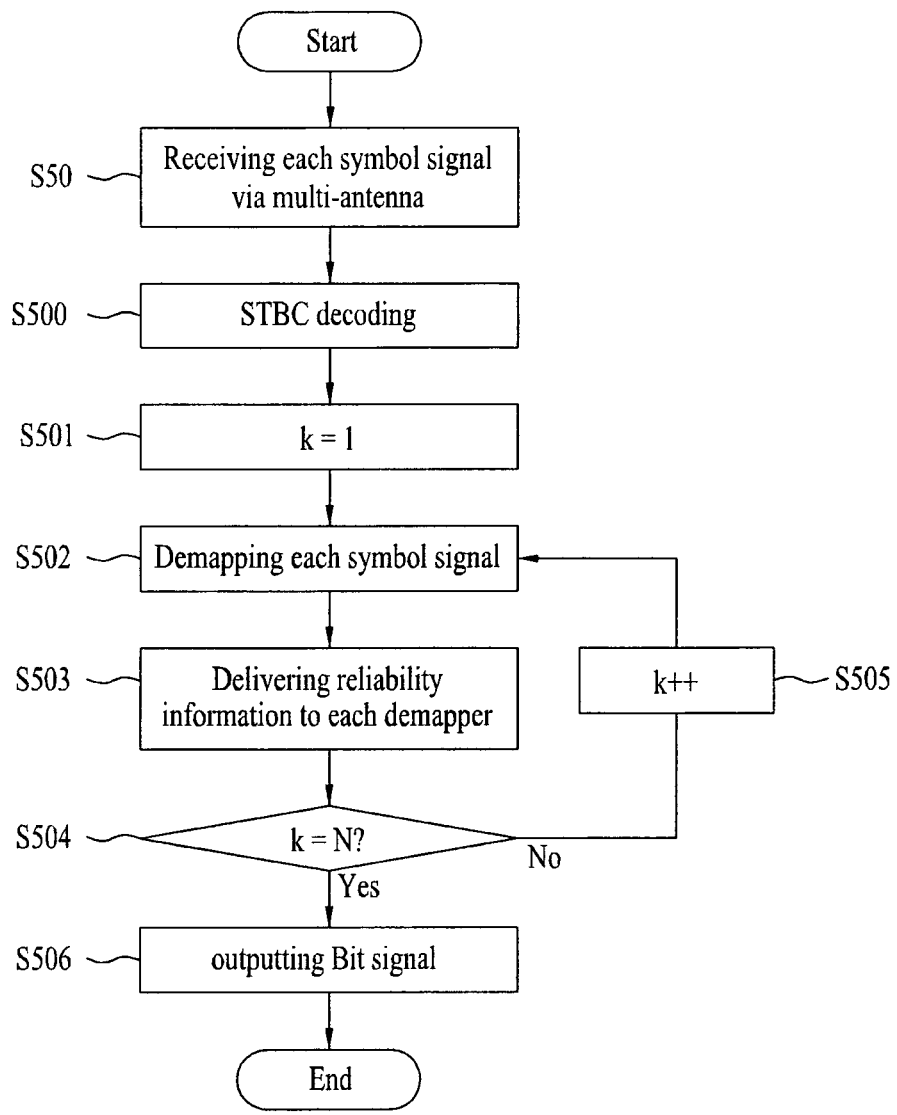
FIG. 5 is a flowchart according to a second embodiment of the present invention.

FIG. 5 is a flowchart according to a second embodiment of the present invention. Operations of a second embodiment of the present invention are explained in detail with reference to FIG. 4A, FIG. 4B, and FIG. 5 as follows.

Referring to FIG. 4A, FIG. 4B, and FIG. 5, each OFDM symbol signal transmitted by a transmitting terminal 40 is received by a receiving terminal 400 via an antenna module 401 included in the receiving terminal 400 (S50).

The received signal is Fourier-transformed by a FFT 402. By the Fourier transform, a signal on a time domain is transformed into a signal on a frequency domain. The Fourier-transformed signal is decoded by an STBC (space time block code) decoder 403 (S500).

The STBC decoded signal is then inputted to a corresponding demapper 404a included in a demapping module 404.

An STBC decoded symbol signal is transformed into a bit signal by the demapping module 404 (S502).

The transformed bit signal, that is, a bit sequence is converted from parallel sequence to serial sequence by a parallel/serial converter 405 and then inputted to a bit deinterleaver 406. The bit deinterleaver 406 changes an order of the bit sequence into an order prior to interleaving in the transmitting terminal 40. The rearranged bit sequence is used to output reliability information for each bit via a soft-input soft-output (SISO) module 407 (S503). The SISO module 407 is capable of calculating the reliability information by Formula 1. The calculated reliability information is inputted to a bit interleaver 408 to change an order of the reliability information for each bit by the same method of changing the order of the bit sequence in the transmitting terminal 40.

The order-changed reliability information sequence is inputted to the corresponding demapper 404a respectively (S503).

The demapper re-executes demapping using the reliability information and then outputs a more accurate bit signal (S506).

A reliability information value for the bit signal is calculated again via the SISO module 407. In this case, the calculation is carried out using the calculated previous reliability information value. As a result, by increasing an absolute value of the signal outputted from the calculation, estimation of the reliability information value can be made more accurately. A demapping process by outputting the above reliability information is repeatedly carried out as many as a prescribed count. Therefore, data bit signal, which is estimated in a manner that the demapping module 404 and the SISO module 407 mutually enhance their functions, is finally estimated and outputted (S506).

In the above method, a signal is demodulated using each demapper included in a demapping module wherein the signal is received via at least two antennas. Also, reliability information for each of the demapped bit signals is generated and then delivered to the corresponding demapper again. Hence, decoding performance is enhanced by iterative decoding using the reliability information.

Furthermore, it is able to reduce effect attributed to a channel in signal transmission by enhancing transmission diversity effect in a manner of applying a plurality of antennas and space time block coding scheme.

Figure 6:
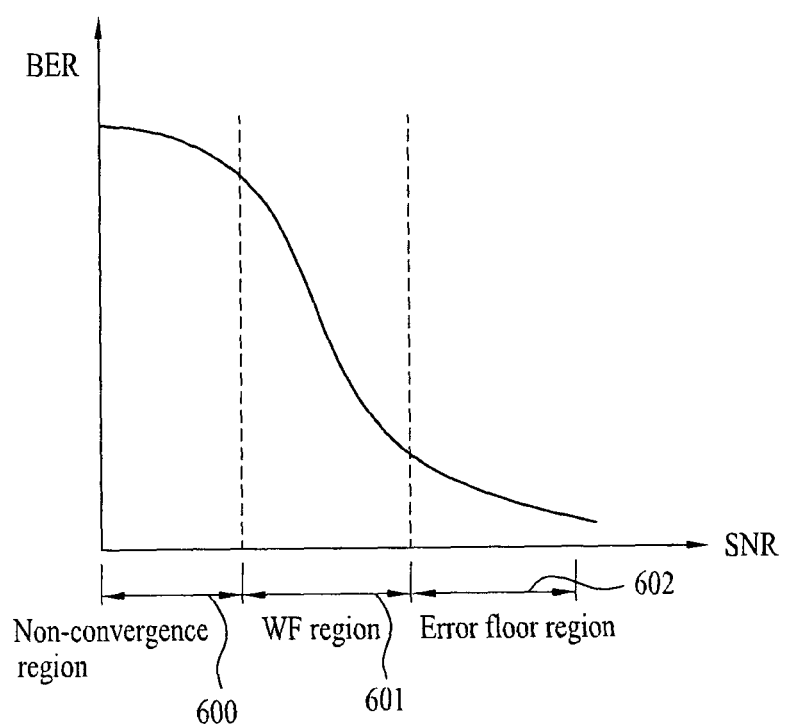
FIG. 6 is a graph of correlation between a signal to noise ratio (SNR) and a bit error rate (BER)

FIG. 6 is a graph of correlation between a signal to noise ratio (SNR) and a bit error rate (BER).

First of all, if a transmission power of a signal is raised, a bit error rate is reduced. Therefore, signal reception performance is enhanced. Referring to FIG. 6, it can be observed that a BER value is reduced if an SNR is increased.

For the enhancement of the reception performance, a strength of a signal, i.e., a transmission power of a signal may be raised, but an available transmission power for transmission is limited generally. Thus, if the iterative decoding is carried out for the enhancement of the reception performance according to one embodiment of the present invention, it is able to raise the strength of the signal by applying iterative decoding without increment of a transmission power level. Namely, FIG. 6 shows an iterative decoding executed curve. It can be observed from FIG. 6 that by increasing the strength of the signal through the iterative decoding, a bit error rate is reduced to enhance the reception performance.

Hereinafter, regions of the iterative decoding executed curve are explained with reference to FIG. 6.

Here, the iterative decoding executed curve can be divided into three regions. For instance, the iterative decoding executed curve can be divided into a non-convergence region 600, a waterfall (WF) region 601, and an error floor region 602.

The non-convergence region 600 is a region that does not show the explicit performance enhancement despite the application of the iterative decoding. In the non-convergence region 600, a gray mapping (mapping rule just having a 1-bit difference between mapping symbols closest to each other) shows good performance.

The WF region 601 is a region in which overall reception performance can be determined through the iterative decoding.

In addition, the error floor region 602 is a region where a BER is not considerably changed according to SNR due to performance of a channel encoder.

When the iterative decoding is used, in the WF region where the iterative decoding affects the reception performance, performance of a demapper can affect total system performance. In particular, a coding gain can be increased by optimizing the mapping used for the iterative decoding.

Since the conventional STBC-OFDM system employing the bit interleaved coded modulation (hereinafter abbreviated BICM) uses only the gray mapping rule, the advantages of the BICM scheme are not sufficiently utilized. Namely, a mapping rule having good performance in an error floor region shows good performance finally.

An optimized mapping rule can be selected by considering a coding scheme and/or a modulating scheme used in a communication system. For instance, there are various available mapping rules corresponding to modulation schemes such as QPSK, 8PSK, 16QAM, 64QAM, and the like.

As mentioned in the foregoing description, as long as an optimized mapping rule is selected among the various mapping rules and used for the iterative decoding, the performance of a demapper can be enhanced. Furthermore, it will help enhancement of overall system performance. In the following description, examples for a method of selecting a suitable mapping rule from various mapping rules are explained.

Firstly, a proper reference may be taken into consideration to select a mapping rule.

As an example of a reference to be considered to select a mapping rule, a communication system may be used. For instance, a mapping rule can be selected according to which one of various communication systems such as BICM, ST-BICM, BICM-ID, STBC-BICM-ID, and the like is used. Since a performance or an effect of the demapper may differ in correspondence to features of a communication system, better reception performance can be expected if an optimized mapping rule is selected by considering the various features of each of the communication systems.

As another example of a reference to be considered to select a mapping rule, target performance in correspondence to transmitted data traffic or the aforesaid communication system may be used. As an example for indicating target performance, there is BER (bit error rate), FER (frame error rate), PER (packet error rate), or the like. Since mapping rules bringing good effect may differ according to, targeted BER values, a mapping rule can be selected by considering the target performance.

Moreover, a mapping rule can be selected by considering an average value for a total bit error, i.e., a mean bit error value which will be explained in detail in the following description. It is more efficient to select and use an optimized mapping rule for each of considerations rather than use a general mapping rule considering various communication systems, target performance or the like.

Performance of a demapper of a receiving terminal can be expressed as a multiplication between the mean bit error value and a symbol error probability. This is represented as following formula 5.

$$P_{demap} \approx N_b P_e.$$ [Formula 5]

In Formula 5, a symbol error probability $P_e$ is a function of a harmonic mean of a minimum squared Euclidean distance and SNR in a constellation mapping graph. As can be observed from Formula 5, the performance of the demapper of the receiving terminal is associated with a average value for total bit error, i.e., a mean bit error value $N_b$, which can be taken into consideration to select a mapping rule having good performance in the WF region 601.

As mentioned in the foregoing description, $N_b$ may not affect the demapper performance, more particularly, performance in the error floor region 602. This is because one bit error can be found for all mapping rules on the assumption that feedback is ideally performed in the error floor region 602.

An example of determining the mean bit error value $N_b$ is represented in Formula 6.

$$N_b = \sum_{i=0}^{M-1} p_x(i) \sum_{j=1}^{N_i} n_b(i,j).$$ [Formula 6]

In Formula 6, $p_x(i)$ indicates a probability value corresponding to a symbol signal x(i) of an $i^{th}$ (constellation)

symbol signal in constellation mapping, $N_i$ indicates a number of points of neighboring constellation mapping of the $i^{th}$ symbol signal x(i), i.e., a number of neighboring constellations, and $n_b(i, j)$ indicates a number of bit errors that the $i^{th}$ symbol signal x(i) is incorrectly demodulated into a $j^{th}$ symbol signal x(j). So, the mean bit error value is a variable value in correspondence to a given mapping rule.

As still another example of a reference to be considered to select a mapping rule, a harmonic mean of a minimum Euclidean distance may be used. In this case, the harmonic mean of the minimum Euclidean distance is a variable corresponding to a distance between a transmission symbol and a received symbol that may be erroneous in a constellation mapping graph. An example of a method of deciding a harmonic mean of a minimum Euclidean distance is proposed by Formula 7A.

$$d_h^2 = \left( \frac{1}{m 2^m} \sum_{i=1}^{m} \sum_{b=0}^{1} \sum_{x \in X_b^i} \frac{1}{|x-z|^2} \right)^{-1} \quad \text{[Formula 7A]}$$

Formula 7A is applied to M-antilogarithm constellation mapping. In Formula 7A, 'm' indicates $Log_2(M)$ and x means a signal subset for each antenna provided in each transmission time on the assumption that x is equal for the transmitting antennas. And, $x_b^i$ indicates a signal subset grouped into m-bit sequence to configure a symbol for each transmitting antenna. Namely, it indicates a subset that a bit of an $i^{th}$ bit is 'b'. A value of the 'b' can be set to '0' or '1'. In Formula 7A, 'x' indicates a transmitted symbol signal and 'z' indicates an error symbol signal.

Another example of a method of deciding a harmonic mean of a minimum Euclidean distance is shown in Formula 7B.

$$d_h^2 = \left( \frac{1}{m 2^m} \sum_{i=1}^{m} \sum_{b=0}^{1} \sum_{x \in X_b^i} \left( \frac{1}{|x-z|^2} \right)^{N_r} \right)^{-1/N_r} \quad \text{[Formula 7B]}$$

Formula 7B differs from Formula 7A in considering a plurality of receiving antennas. In Formula 7B, 'Nr' indicates a number of receiving antennas. This means that the harmonic mean of the minimum Euclidean distance, i.e., a selected mapping rule may be changed in correspondence to a number of receiving antennas.

In case of performing iterative decoding, the Euclidean distance can be defined into two cases to select a mapping rule. $d_h^2$ (before) and $d_h^2$ (after) are defined as the Euclidean distance before iterative decoding and the Euclidean distance after iterative decoding, respectively. Namely, $d_h^2$ (before) and $d_h^2$ (after) mean the Euclidean distance of mapping of the non-convergence 600 before executing iterative decoding and the Euclidean distance in the error floor 602 after executing iterative decoding, respectively.

In the following description, an example of a method of selecting a mapping rule is explained by referring to the examples of the references to be considered to select the mapping rule.

Firstly, a plurality of mapping rules may be grouped into at least one group according to a specific reference. Here, the specific reference may be one or more of the communication system, the target performance (e.g., BER value), the mean bit error value, and the like. Since each of at least one group may correspond to the plurality of the mapping rules, we can select a suitable group and then a mapping rule may be selected from the selected group. Thus, a search area for selecting a mapping rule can be reduced as well as a time taken to select a mapping rule.

Hereinafter, as an example of a method of selecting a mapping rule, and more particularly, a method of grouping and selecting a mapping rule by considering a mean bit error and a harmonic mean of a minimum Euclidean distance will be explained in detail.

Firstly, $d_h^2$ (before), $d_h^2$ (after), and $N_b$ are calculated using Formula 6 and Formula 7A or Formula 7B for an optimized constellation mapping. Available mapping rules are grouped into at least one group according to the calculated $N_b$. The at least one mapping rule having the biggest $d_h^2$ (after) is selected from each of the groups. A mapping rule having the biggest $d_h^2$ (before) is selected from the mapping rules selected as having the biggest $d_h^2$ (after). Here, there may be at least one mapping rule having the biggest $d_h^2$ (before). In this case, a mapping rule having best performance by tests according to a configuration of a system may be selected as a mapping rule having the biggest $d_h^2$ (before).

In the error floor region 602 after execution of the iterative decoding, an optimized mapping rule can be selected by the following process. The graph shown in FIG. 6 can be differently represented according to a type of the mapping. In particular, there could be a variation of a slope of the BER curve or the like according to what kind of mapping rule is used in executing mapping or demapping. The variation changes the SNR to which the error floor region 602 corresponds. As the SNR to which the error floor region 602 corresponds gets smaller, so the performance becomes better. As the SNR in which the error floor region 602 corresponding to the targeted BER exists gets smaller, the performance of decoding gets better.

Figure 7:
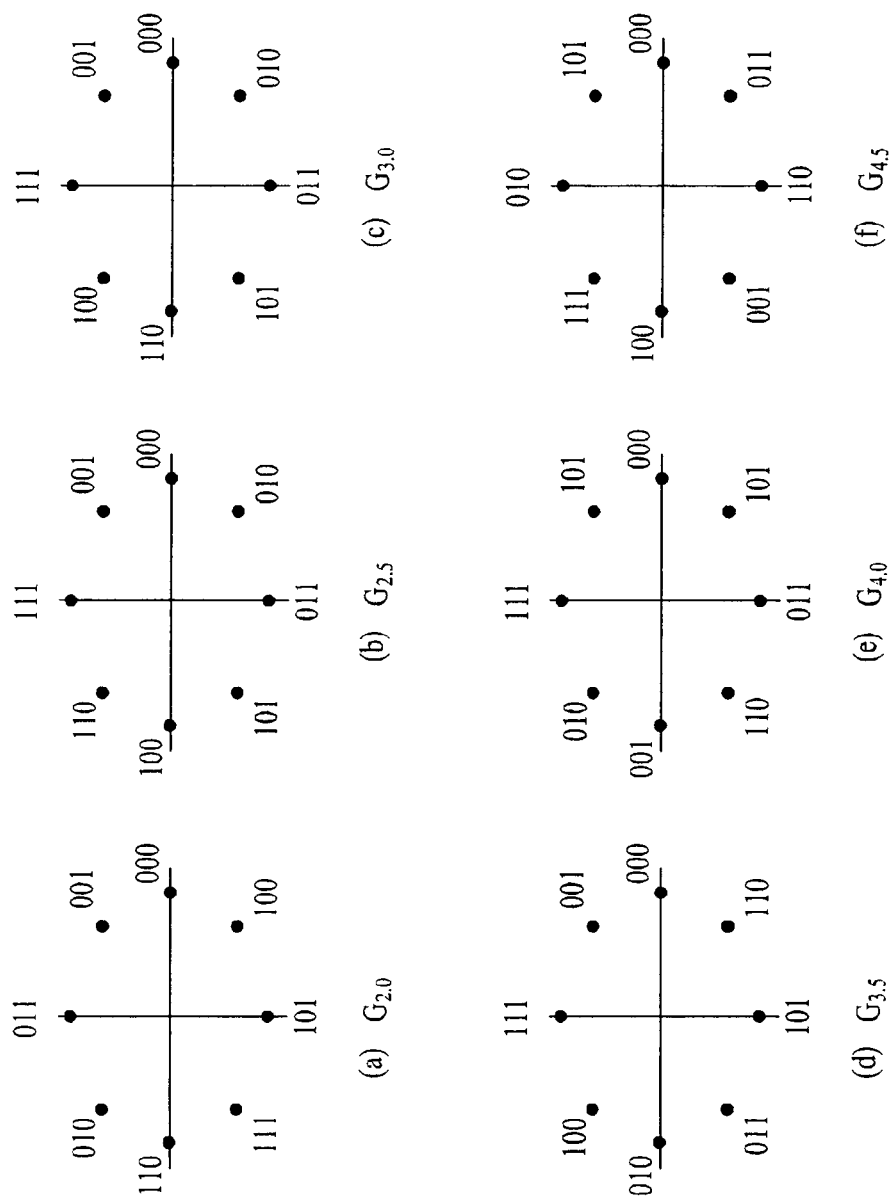
FIG. 7 is an exemplary diagram of 8PSK constellation mapping rule according to one preferred embodiment of the present invention.

FIG. 7 is an exemplary diagram of 8PSK constellation mapping rule according to one preferred embodiment of the present invention.

In case of 8PSK, a mapping rule ($N_b$=2.0) proposed by (a) of FIG. 7 appears better performance if iterative decoding is not performed.

On the other hand, in an error floor region having executed iterative decoding, a mapping rule ($N_b$=4.5) proposed by (f) of FIG. 7 shows best performance.

The exemplary optimized mapping rule among the groups is the mapping rule shown in FIG. 7.

In case of $N_b$=2.0, the mapping rule, by which binary codes of a mapping rule are decided in order of 000, 001, 011, 010, 110, 111, 101, and 100 counterclockwise, proposed by (a) of FIG. 7 shows the best performance.

In case of $N_b$=2.5, the mapping rule, by which binary codes of a mapping rule are decided in order of 000, 001, 111, 110, 100, 101, 011, 010 counterclockwise, proposed by (b) of FIG. 7 shows the best performance.

In case of $N_b$=3.0, the mapping rule, by which binary codes of a mapping rule are decided in order of 000, 001, 111, 100, 110, 101, 011, 010 counterclockwise, proposed by (c) of FIG. 7 shows the best performance.

In case of $N_b$=3.5, the mapping rule, by which binary codes of a mapping rule are decided in order of 000, 001, 111, 100, 010, 011, 101, 110 counterclockwise, proposed by (d) of FIG. 7 shows the best performance.

In case of $N_b$=4.0, the mapping rule, by which binary codes of a preset mapping rule are decided in order of 000, 010, 111, 100, 001, 110, 011, 101 counterclockwise, proposed by (e) of FIG. 7 shows the best performance.

In case of $N_b$=4.5, the mapping rule, by which binary codes of a mapping rule are decided in order of 000, 101, 010, 111, 100, 001, 110, 011 counterclockwise, proposed by (f) of FIG. 7 shows the best performance.

FIG. 8 is an exemplary diagram of 16QAM constellation mapping rule according to one preferred embodiment of the present invention.

In 16QAM, a gray mapping (mapping rule having 1-bit difference between closest mapping symbols) corresponds to $N_b$=3.0 and shows best performance when iterative decoding is not performed. Yet, if iterative decoding is applied, "Mixed Labeling", "Modified SP Labeling", "Random Labeling", "M16$^r$ Labeling", "Maximum SEW Labeling", or the like shows good performance in an error floor region. In this case, '$N_b$' of each of the labeled mapping rules is 5, 6.5, 6.5, 7, or 9.

The mapping rules having the good performance of each group are those shown in FIG. 8. In this case, the corresponding mapping rules include "Mixed Labeling" (a), "Random Labeling" (b), "Gray Labeling" (c), "Maximum SEW Labeling" (d), "M16$^r$ Labeling" (e), "Modified SP Labeling" (f), etc. The arrangement of the binary codes in each of the mapping rules is shown in FIG. 8.

Figure 9A:
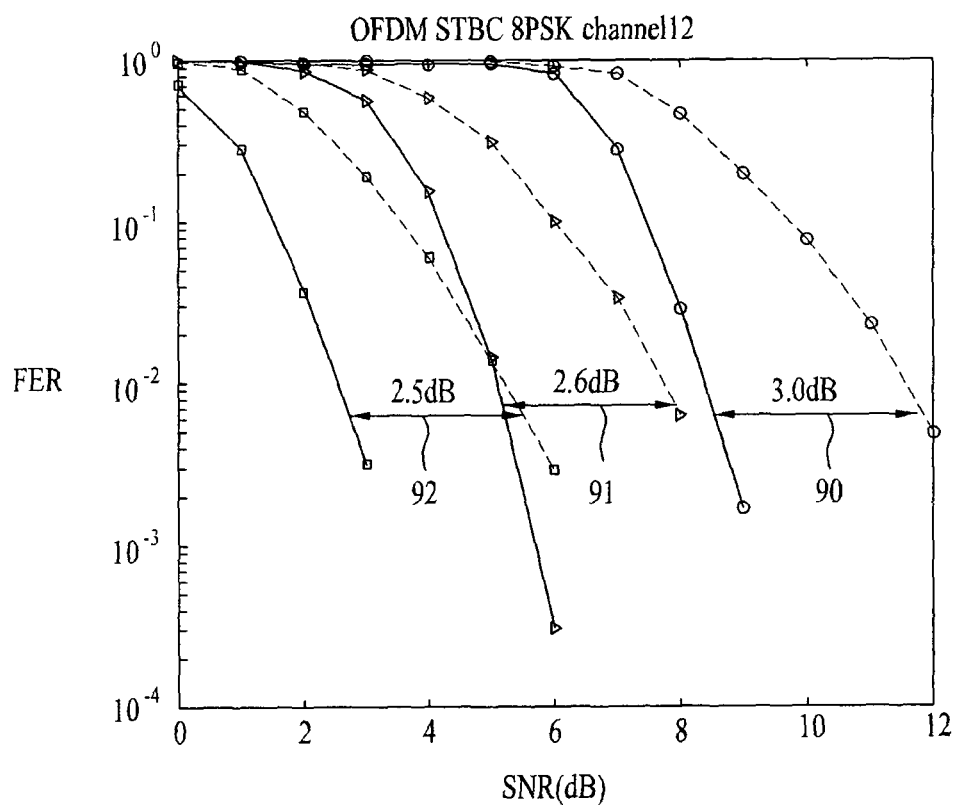
FIG. 9A and FIG. 9B are graphs for effects of one preferred embodiment of the present invention.
Figure 9B:
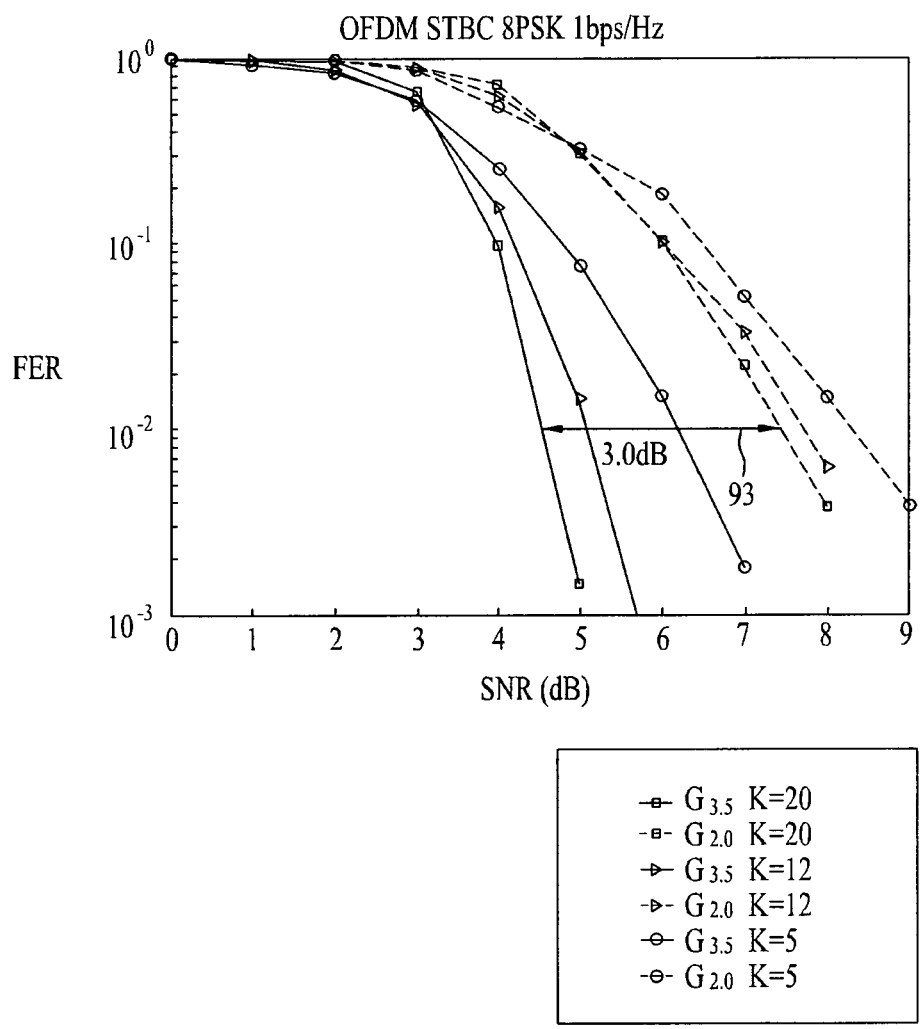

FIG. 9A and FIG. 9B are graphs for effects of one preferred embodiment of the present invention.

FIG. 9A is a performance graph in case of applying iterative decoding to a space time block coded orthogonal frequency division multiplexing system. It can be observed that system performance is enhanced through optimization of a used mapping rule by applying iterative decoding without transmission power increment in a same channel environment.

The graph shown in FIG. 9A indicates a result in case of using STBC (¾ rate orthogonal STBC) in the exponentially decaying Rayleigh fading channel environment when there exist 12 multi-paths by applying the 8PSK mapping rule.

If 12 channel paths are proposed in FIG. 9A, different code rates are applied. And, transmission efficiencies become 0.75 bps/Hz, 1 bps/Hz, and 1.5 bps/Hz corresponding to code rates ⅓, 4/9, and ⅔, respectively.

As a result, in case of 0.75 bps/Hz, a mapping rule ($N_b$=3.0) has best efficiency. Compared to the mapping rule ($N_b$=2.0) at 1% FER, the mapping rule ($N_b$=3.0) has a gain of 2.5 dB (92).

On the other hand, in case of 1 or 1.5 bps/Hz, a mapping rule ($N_b$=3.5) has best efficiency. In this case, there is a gain of 2.6 dB or 3.0 dB (91, 90).

FIG. 9B shows an execution result when a code rate is 4/9 in a different channel status. Assuming that a channel has 5, 12, 20 tab (multi-path), compared to the mapping rule ($N_b$=2.0), the mapping rule ($N_b$=3.5) shows the best performance. Namely, in case of the same frequency efficiency, the optimized mapping rule can be sustained without channel variation in a manner of reducing effect on channel by increasing diversity effect through the STBC scheme. And, it can be observed from the graph that the mapping rule ($N_b$=3.5) has a gain of about 3 dB, compared to the mapping rule ($N_b$=2.0), according to the increment of a number of channels (93).

Figure 10A:
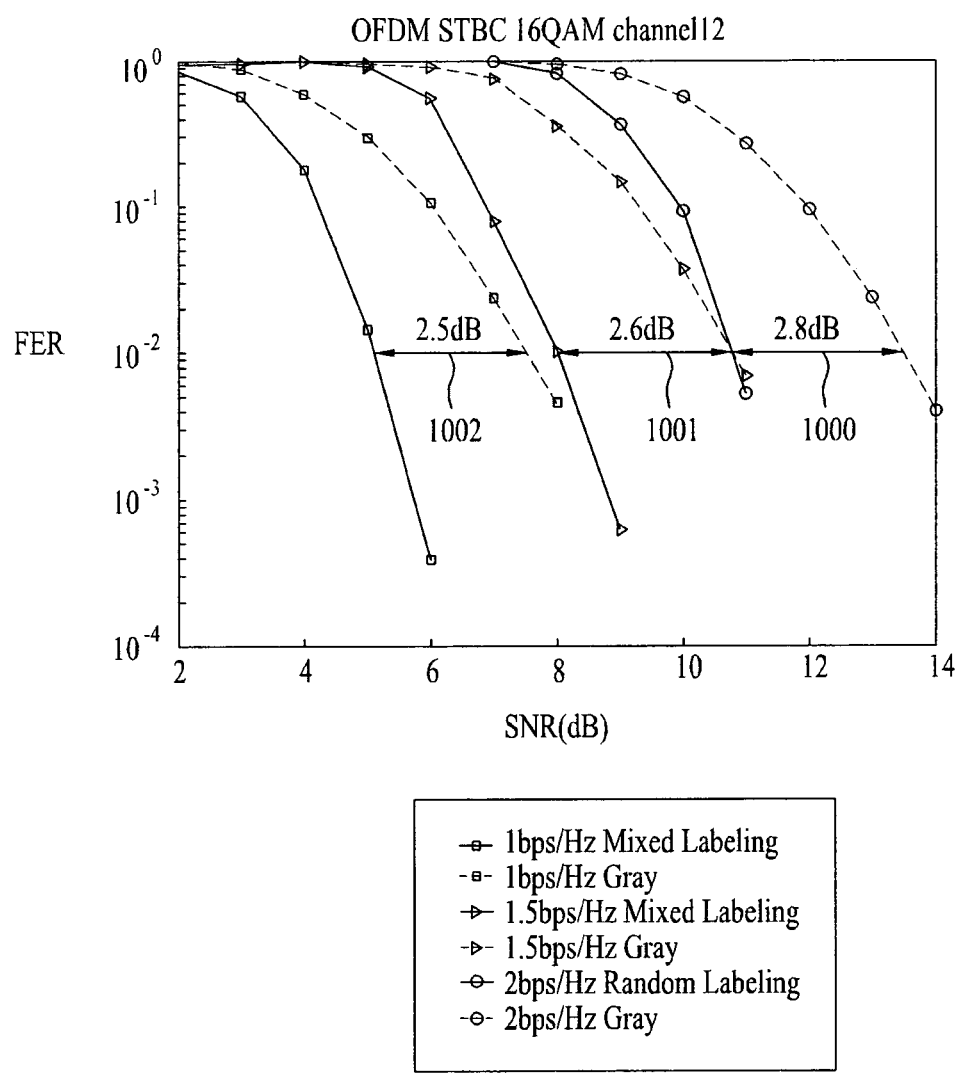
FIG. 10A and FIG. 10B are graphs for effects of one preferred embodiment of the present invention.
Figure 10B:
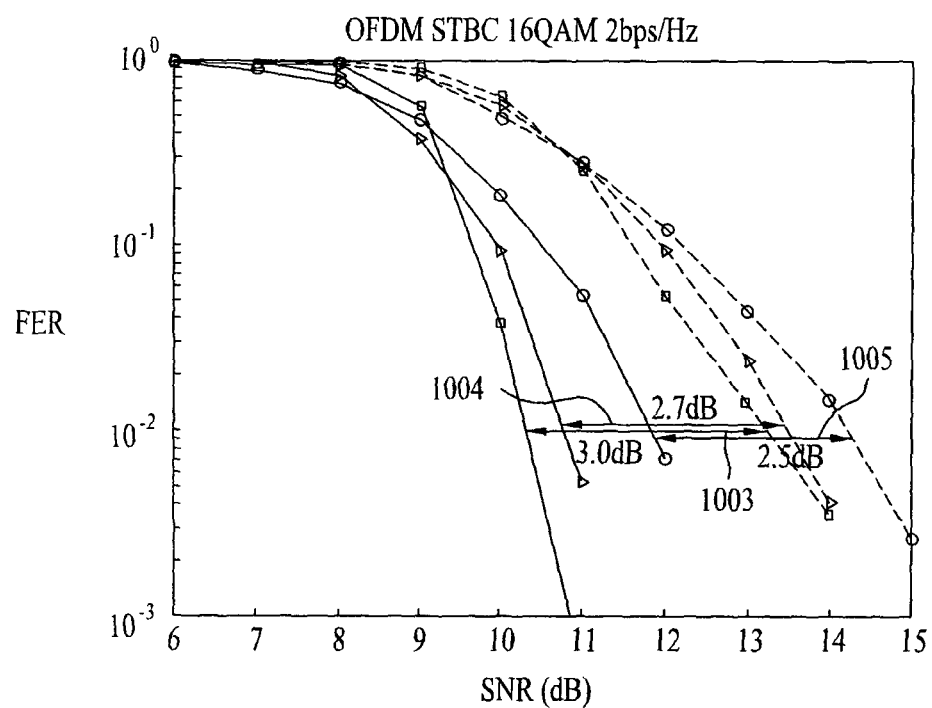

FIG. 10A and FIG. 10B are graphs for effects of one preferred embodiment of the present invention.

FIG. 10A is a performance graph in case of applying iterative decoding to a space time block coded orthogonal frequency division multiplexing system. It can be observed that system performance is enhanced through optimization of a used mapping rule by applying iterative decoding without transmission power increment in a same channel environment.

The graph shown in FIG. 10A indicates a result in case of using STBC (¾ rate orthogonal STBC) in the exponentially decaying Rayleigh fading channel environment when there exist 12 multi-paths by applying the 16QAM mapping rule.

If 12 channel paths are proposed in FIG. 10A, different code rates are applied. And, transmission efficiencies become 1 bps/Hz, 1.5 bps/Hz, and 2 bps/Hz corresponding to code rates ⅓, ½, and ⅔, respectively.

In case that the transmission efficiency is 1 bps/Hz or 1.5 Hbps/Hz, when the mapping rule of 'Mixed Labeling' at 1% FER is used, there is a gain of 2.5 dB or 2.6 dB, therefore, good performance could appears (1002 or 1001). And, it can be observed that there is a gain of 2.8 dB at 1% FER when the mapping rule of 'Random Labeling' is used in case of 2 bps/Hz (1000).

FIG. 10B shows an execution result of a convolution code using the same modulation scheme when a code rate is ⅔ in various channel states. It is assumed that a channel has 5, 12, 20 tab (multi-path). Compared to the case of using the gray mapping (mapping having 1-bit difference between closest mapping symbols), the case of using the mapping rule of 'Random Labeling' among the various mapping rules has gains 2.5 dB, 2.7 dB, and 3 dB for the respective channel numbers (1005, 1004, 1003). Similar to the case of 8PSK, the present case shows that a gain of a mapping rule having better performance in correspondence to the incremented channel number is increased.

According to the simulation result, a gain resulted from an optimized mapping rule is increased according to an increased code rate. Once such a system variable as a code rate, a modulation level, and the like is determined, it can be observed that a mapping rule having the best performance does not vary without being affected by a changed channel status. In particular, in case of the same frequency efficiency, by reducing the effect on the channel in a manner of increasing the diversity effect through the STBC scheme, the optimized mapping rule can be sustained regardless of the channel variation. In other words, the mapping rule having the optimal performance for the various channel statuses and transmission efficiencies can be fixed. So, once the mapping rule having the best performance is proposed, the mapping rule is intactly applicable to various channel statues to show the best performance.

According to another embodiment of the present invention, as mentioned in the foregoing description, in case of using the mapping rule selectively, an interleaving rule or permutation rule is adaptively applicable.

As above mentioned, interleaving means that the coded bits in form of bit sequence are disperse by a prescribed bit unit and that bits are independently arranged, to reduce burst error and effect of fading. And, permutation means that coded and modulated data is allocated to each subcarrier in an OFDMA (orthogonal frequency division multiple access) system. As an example of the permutation, there is FUSC (full usage of subcarriers) of allocating subcarriers within a transmission unit as a whole and PUSC (partial usage of subcarriers) of allocating subcarriers within a transmission unit by dividing them into at least one. The interleaving or permutation is executed according to a prescribed rule.

In other words, in case that a optimized mapping rule is selected according to the above-explained embodiment of the present invention, the interleaving rule and/or permutation rule can be adaptively selected or changed to be used. Coding, interleaving, mapping, permutation, and the like are sequentially executable for a single communication process. Therefore, they can be associated with each other. In case that a mapping rule is adaptively usable, if rules used for other processes are adaptively usable, communication efficiency can be further enhanced.

As mentioned in the foregoing description, in case that rules used in at least one communication module could be adaptively selected and used, the rules can be grouped for better effects. For instance, in case that ½ convolution code and 8PSK modulation are used as modulation and coding scheme (MCS) respectively, it is assumed that the mapping rule shown in (b) of FIG. 7 is selected to be used. In this case, since a specific interleaving rule and/or a specific permutation rule are preset to be used on a system, if a mapping rule is selected, a suitable specific interleaving rule and or a suitable specific permutation rule can be used according to the selected mapping rule. If so, after a mapping rule has been selected, it is able to use rules having good performance without deciding an interleaving rule and/or a permutation rule one by one. This can be advantageous in reducing signaling overhead, in aspect of signaling, which is be explained as follows.

According to a further embodiment of the present invention, information for an optimized mapping rule in a system using a method for selecting to use a suitable mapping rule can be informed. Informing downlink of the information for an optimized mapping rule selected in a system shall be named 'signaling' in the following description.

As an example of a signaling method, there is a method of assigning indexes to available mapping rules and transmitting index information corresponding to a selected mapping rule. For instance, in case that there are total 8 available mapping rules, total 3 bits are allocated to signaling information bits for the mapping rules and indexes 000 to 111 are assigned to the total 8 available mapping rules, respectively. So, as a result of selection, if the mapping rule corresponding to the index 101 is selected, signaling information corresponding to the index 101 can be transmitted.

As another example of a signaling method, there is a method of connecting a mapping rule to another signaling information correlated to the mapping rule. For instance, correlations between MCS and corresponding mapping rules are preset in a system. And, it can be only informed whether a mapping rule correlated to a decided MCS is used. In particular, in case that a third MCS is used, it is assumed that the mapping rule shown in (c) of FIG. 7 is decided to be selected. In case that a fourth MCS is used, it is assumed that the mapping rule shown in (d) of FIG. 7 is decided to be selected. If the MCS is decided as the third, the system may indicate the information for the mapping rule in a manner of transmitting signaling information of '1' for the case of using the mapping rule shown in (c) of FIG. 7 or signaling information of '0' for the case of not using the mapping rule shown in (c) of FIG. 7, using 1 bit as a signaling information bit for informing the mapping rule.

As mentioned in the foregoing description, in case of using a coding rule and/or a permutation rule adaptively according to a mapping rule, information for the coding rule, the interleaving rule and/or the permutation rule can be informed by the method similar to that used for the signaling of the mapping rule.

Although the present invention is suitable for a wide scope of applications, it is particularly suitable for mapping a transmission signal more effectively and decoding a received signal in case of transceiving signals using a multi-antenna.

INDUSTRIAL APPLICABILITY

Accordingly, the present invention provides the following effects or advantages.

First of all; communication can be efficiently performed by enhancing performance of transmitting and receiving terminals in a mobile communication system. In particular, diversity is more effectively provided in multi-antenna transmission, whereby effect on channel variation can be reduced.

Secondly, the present invention enhances performance of a decoder, thereby increasing a coding gain.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of processing a signal in a receiving terminal having a plurality of antennas, the method comprising:
   demapping a symbol signal received via the plurality of antennas to a bit signal according to a mapping rule that is adaptively determined;
   extracting reliability information for the bit signal obtained from the demapping; and
   re-performing the demapping of the symbol signal using the reliability information,
   wherein determining the mapping rule comprises:
   calculating a mean bit error value for each of one or more available mapping rules, a harmonic mean of a minimum Euclidean distance in an error floor and a non-convergence harmonic mean of a minimum Euclidean distance;
   dividing the one or more available mapping rules into at least one mapping group according to the mean bit error value;
   selecting at least one mapping rule having a biggest harmonic mean of the minimum Euclidean distance in the error floor within each of the at least one mapping group; and
   selecting at least one mapping rule having a biggest non-convergence harmonic mean of the minimum Euclidean distance from the selected at least one mapping rule.

2. The method of claim 1, wherein the symbol signal is coded using a space-time block code (STBC).

3. The method of claim 2, further comprising decoding the symbol signal using the STBC.

4. The method of claim 1, wherein extracting the reliability information and re-performing demapping are each repeated up to a prescribed count.

5. The method of claim 1, wherein the reliability information corresponds to a ratio of a probability that the bit signal becomes "0" to a probability that the bit signal becomes "1".

6. The method of claim 1, wherein binary codes of a preset mapping rule are determined counter-clockwise in order of 000, 001, 111, 100, 010, 011, 101, and 110 if the mapping rule is modulated by an 8 PSK (Phase Shift Keying) scheme.

7. The method of claim 1, further comprising signaling of information for the mapping.

8. The method of claim 7, wherein signaling the information comprises using either index information for the mapping rule or information indicating whether the mapping rule corresponds to different signaling information.

9. The method of claim 1, wherein determining the mapping rule further comprises considering a number of the plurality of antennas.

10. A receiving apparatus having a plurality of antennas, the receiving apparatus comprising:
   a demapping module configured to obtain a bit signal estimated by performing demapping on a symbol signal received via the plurality of antennas and re-performing the demapping on the symbol signal using reliability information for the bit signal; and a reliability information extracting unit configured to extract the reliability information by receiving the estimated bit signal from the demapping module and providing the extracted reliability information to the demapping module, wherein the demapping module is further configured to:

calculate a mean bit error value for each of one or more available mapping rules, a harmonic mean of a minimum Euclidean distance in an error floor and a non-convergence harmonic mean of a minimum Euclidean distance;

divide the one or more available mapping rules into at least one mapping group according to the mean bit error value;

select at least one mapping rule having a biggest harmonic mean of the minimum Euclidean distance in the error floor within each of the at least one mapping group; and select at least one mapping rule having a biggest non-convergence harmonic mean of the minimum Euclidean distance from the selected at least one mapping rule.

11. The receiving apparatus of claim 10, wherein the symbol signal is coded using space-time block code (STBC).

12. The receiving apparatus of claim 11, further comprising a decoding module configured to:

receive the coded symbol signal; and decode the received symbol signal using the STBC.

13. The receiving apparatus of claim 10, further comprising a soft-in soft-out module configured to output the reliability information for the estimated bit signal via the demapping module.

* * * * *